(12) United States Patent
Wu et al.

(10) Patent No.: US 8,641,297 B2
(45) Date of Patent: Feb. 4, 2014

(54) RECEPTACLE STRUCTURE FOR OPTICAL SUB-ASSEMBLY FOR TRANSCEIVERS

(75) Inventors: Chin-Tsung Wu, Taipei (TW);
Kuei-Hsiang Cheng, Taipei (TW)

(73) Assignee: EZconn Corproation, Taipei (TW)

( * ) Notice: Subject to any disclaimer, the term of this patent is extended or adjusted under 35 U.S.C. 154(b) by 172 days.

(21) Appl. No.: 13/106,075

(22) Filed: May 12, 2011

(65) Prior Publication Data
US 2012/0288234 A1  Nov. 15, 2012

(51) Int. Cl.
*G02B 6/36* (2006.01)

(52) U.S. Cl.
USPC .......................................................... 385/92

(58) Field of Classification Search
None
See application file for complete search history.

(56) References Cited

U.S. PATENT DOCUMENTS

| | | | |
|---|---|---|---|
| 5,315,680 A * | 5/1994 | Musk et al. | 385/88 |
| 5,631,987 A * | 5/1997 | Lasky et al. | 385/88 |
| 6,749,347 B1 | 6/2004 | Ichihara et al. | |
| 6,840,684 B2 * | 1/2005 | Melchior et al. | 385/66 |
| 6,925,234 B2 * | 8/2005 | Alexeev et al. | 385/52 |
| 7,212,714 B2 * | 5/2007 | Wisecarver | 385/52 |
| 7,458,731 B2 * | 12/2008 | Chen et al. | 385/88 |
| 7,572,064 B2 | 8/2009 | DeJong | |
| 7,702,198 B2 * | 4/2010 | Shibayama | 385/33 |
| 2005/0286839 A1 * | 12/2005 | Yoshikawa | 385/92 |
| 2006/0275001 A1 * | 12/2006 | Nakanishi et al. | 385/93 |
| 2007/0122091 A1 | 5/2007 | Kobayashi | |
| 2011/0033159 A1 | 2/2011 | Kojima et al. | |

FOREIGN PATENT DOCUMENTS

| | | |
|---|---|---|
| CN | 2864719 | 1/2007 |
| CN | 101595412 | 12/2009 |
| JP | 61-138217 | 6/1986 |
| JP | 7-333469 | 12/1995 |
| JP | 200564219 | 3/2005 |
| JP | 2007-334015 | 12/2007 |

* cited by examiner

*Primary Examiner* — Sarah Hahm
(74) *Attorney, Agent, or Firm* — Litron Patent and Trademark Office; Min-Lee Teng

(57) ABSTRACT

A receptacle structure for optical sub-assembly for transceivers includes: a receiving tube; a base seat coaxially disposed in the receiving tube, the base seat having a first fiber stub receiving hole and a second fiber stub oblique receiving hole; a sleeve coaxially disposed in the base seat and the receiving tube; a first fiber stub coaxially disposed in the first fiber stub receiving hole of the base seat and the receiving tube; a second fiber stub connected in the second fiber stub oblique receiving hole of the base seat; and an optical fiber installed between the first and second fiber stubs. The second fiber stub is disposed in the base seat in an inclined state, whereby the coupling loss is reduced and the optical coupling efficiency is increased.

7 Claims, 3 Drawing Sheets

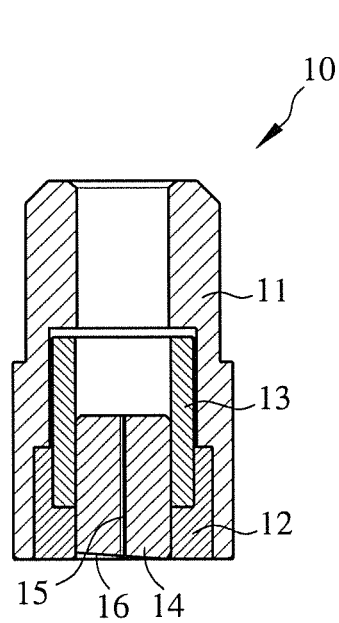
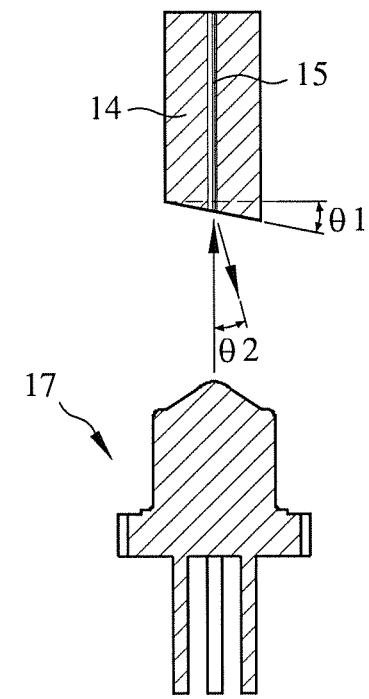
FIG.1A
PRIOR ART
FIG.1B
PRIOR ART
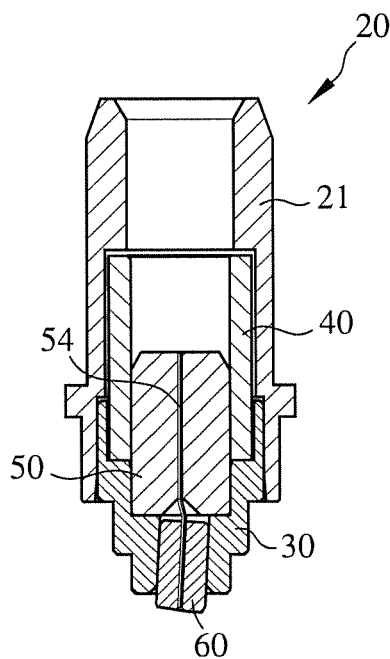
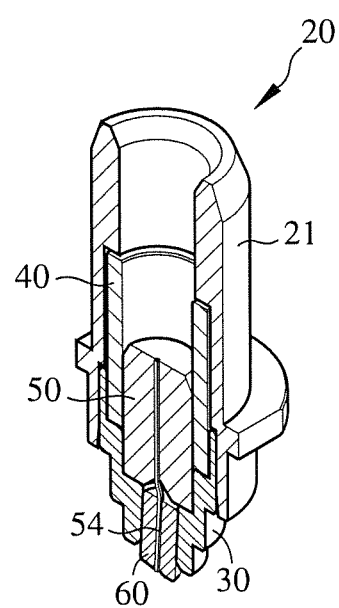
FIG.2
FIG.3

RECEPTACLE STRUCTURE FOR OPTICAL SUB-ASSEMBLY FOR TRANSCEIVERS

BACKGROUND OF THE INVENTION

1. Field of the Invention

The present invention relates to a receptacle structure for optical sub-assembly for transceivers, which is able to increase optical coupling efficiency.

2. Description of the Related Art

In an optical fiber communication system, optical sub-assembly for transceivers is an important medium for conversion between optical signals and electrical signals. The optical sub-assembly for transceivers can be classified into transmitting optical sub-assembly (TOSA) for transmitting optical signals, bi-direction optical sub-assembly (BOSA) capable of receiving bi-direction signals in the same optical fiber and tri-direction optical sub-assembly (TRI-DI OSA) capable of receiving both digital signals and analog signals and transmitting digital signals. Either of the TOSA, BOSA and TRI-DI OSA has a receptacle structure in which an optical fiber module can be plugged to achieve optical coupling alignment for transmitting optical signals.

As shown in FIG. 1A, the receptacle structure 10 includes a receiving tube 11, a base seat 12 coaxially disposed in the receiving tube 11 and positioned at a bottom of the receiving tube 11, a sleeve 13 coaxially disposed in the receiving tube 11 and the base seat 12, and a fiber stub 14 coaxially disposed in the base seat 12 and the sleeve 13. An optical fiber 15 is arranged in the fiber stub 14. The bottom face of the fiber stub 14 is an inclined face 16 for preventing reflection light from being incident on a light-emitting element 17 so as to avoid interference of noises with the light-emitting element 17.

Referring to FIG. 1B, as to geometrical optics, the calculation formula of angle of emergence of light beam is as follows:

$$n \sin(\theta_1) = \sin(\theta_1 + \theta_2), \text{ wherein:}$$

n: refractive index of optical fiber;

$\theta_1$: grinding angle of optical fiber on the end face of the fiber stub; and $\theta_2$: angle contained between the axis of optical fiber and the direction of emergence of the light.

In the above arrangement, the fiber stub 14 is disposed in the base seat 12 in an upright state. In this case, according to the above formula, the direction of incidence of optical signal of the light-emitting element 17 is collinear with the optical fiber 15 rather than coaxial with the direction of emergence of the light of the optical fiber 15. Therefore, according to the theory that an optimal path is achieved when the direction of incidence of light and the direction of emergence of light, (that is, angle of incidence of light and angle of emergence of light), are coaxial with each other, this will cause loss to incident optical signal and needs to be overcome.

SUMMARY OF THE INVENTION

A primary object of the present invention is to provide a receptacle structure for optical sub-assembly for transceivers, which can increase optical coupling efficiency without changing the direction of incidence of light of the light-emitting element.

To achieve the above and other objects, the receptacle structure for optical sub-assembly for transceivers of the present invention includes: a receiving tube; a base seat coaxially disposed in the receiving tube, the base seat having a first fiber stub receiving hole and a second fiber stub oblique receiving hole; a sleeve coaxially disposed in the base seat; a first fiber stub coaxially disposed in the first fiber stub receiving hole of the base seat; a second fiber stub connected in the second fiber stub oblique receiving hole of the base seat; and an optical fiber installed in the first and second fiber stubs. The second fiber stub is disposed in the base seat in an inclined state to rectify the direction of emergence of the light to be coaxial with the direction of incidence of the optical signal of the light-emitting element. Accordingly, the loss to the incident optical signal is reduced and the optical coupling efficiency is increased.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 1A is a sectional view of a conventional receptacle structure for optical sub-assembly for transceivers;

FIG. 1B is a sectional view showing that the conventional fiber stub is arranged in an upright state, also showing the optical paths of the incident optical signal and the emergent optical signal;

FIG. 2 is a sectional view of the receptacle structure for optical sub-assembly for transceivers of the present invention;

FIG. 3 is a perspective sectional view of the receptacle structure for optical sub-assembly for transceivers of the present invention;

DETAILED DESCRIPTION OF THE PREFERRED EMBODIMENT

Figure 4:
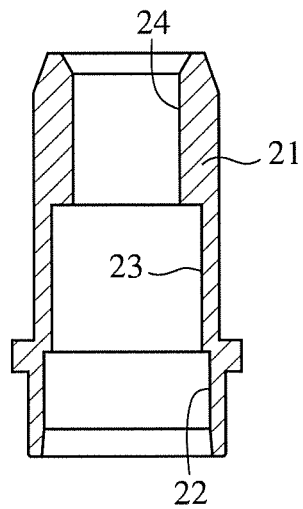
FIG. 4 is a sectional view of the receiving tube of the present invention.

Please refer to FIGS. 2 and 3. The receptacle structure 20 for optical sub-assembly for transceivers of the present invention includes a receiving tube 21, a base seat 30 coaxially disposed in the receiving tube 21 and positioned at a bottom of the receiving tube 21, a sleeve 40 coaxially disposed in the receiving tube 21 and the base seat 30, a first fiber stub 50 coaxially disposed in the base seat 30 and the sleeve 40, a second fiber stub 60 obliquely disposed in the base seat 30 and positioned under the first fiber stub 50; and an optical fiber 54 arranged in the first and second fiber stubs 50, 60.

FIG. 4 shows an embodiment of the receiving tube 21. The receiving tube 21 has an internal first receiving hole 22 for accommodating the base seat 30, an internal second receiving hole 23 for accommodating the sleeve 40 and an internal central hole 24 positioned at an upper end of the receiving tube 21. An optical fiber module can be plugged into the central hole 24 and connected with the receiving tube 21 for transmitting optical signals. The first receiving hole 22 is positioned at a lower end of the receiving tube 21. The first receiving hole 22 has a diameter larger than that of the second receiving hole 23. The diameter of the second receiving hole 23 is larger than the diameter of the central hole 24.

Figure 5:
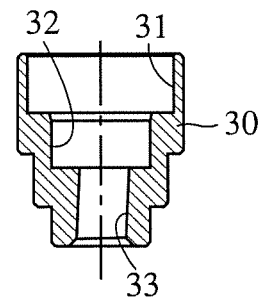
FIG. 5 is a sectional view of the base seat of the present invention.

FIG. 5 shows an embodiment of the base seat 30. The base seat 30 has an internal sleeve receiving hole 31 for accommodating the sleeve 40, an internal first fiber stub receiving hole 32 for accommodating the first fiber stub 50 and an internal second fiber stub oblique receiving hole 33 for accommodating the second fiber stub 60. Accordingly, the second fiber stub 60 is disposed in the base seat 30 in an inclined state.

Figure 6:
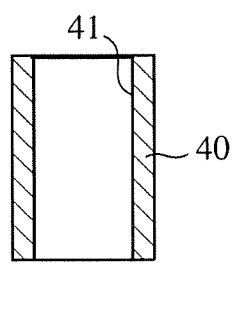
FIG. 6 is a sectional view of the sleeve of the present invention.

FIG. 6 shows an embodiment of the sleeve 40. The sleeve 40 is formed with an internal through hole 41 for receiving the first fiber stub 50.

Figure 7:
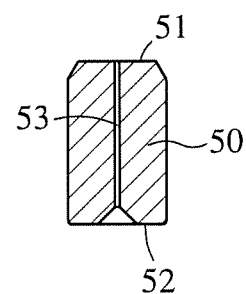
FIG. 7 is a sectional view of the first fiber stub of the present invention.

FIG. 7 shows an embodiment of the first fiber stub 50. The first fiber stub 50 has an upper face 51 and a lower face 52 opposite to each other and an optical fiber passageway 53 axially extending between the upper and lower faces 51, 52.

Figure 8:
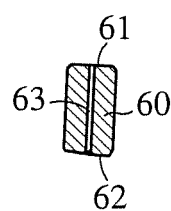
FIG. 8 is a sectional view of the second fiber stub of the present invention.

FIG. 8 shows an embodiment of the second fiber stub 60. The second fiber stub 60 has an upper face 61 and a lower face 62 opposite to each other and an optical fiber passageway 63 axially extending between the upper and lower faces 61, 62. The lower face 62 is an inclined face for preventing reflection light from being directly incident on the light-emitting element so as to avoid interference of noises with the light-emitting element.

An optical fiber 54 is fixed in the optical fiber passageways 53, 63 of the first and second fiber stubs 50, 60, whereby the optical signals of the light-emitting element are coupled to the optical fiber 54.

Figure 9:
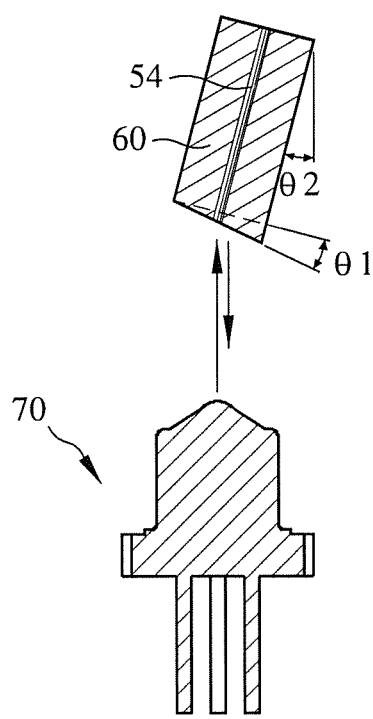
FIG. 9 is a sectional view showing that the second fiber stub of the present invention is inclined by an angle, also showing the optical paths of the incident optical signal and the emergent optical signal.

The second fiber stub 60 is disposed in the second fiber stub oblique receiving hole 33 in an inclined state. Therefore, the direction of emergence of the light is coaxial with the direction of incidence of the light to meet the calculation formula of angle of emergence of light beam. Therefore, the optical signals emitted from the light-emitting element 70 can be mass-accumulated and coupled to the optical fiber 54 of the second fiber stub 60 to reduce coupling loss and greatly increase optical coupling efficiency. As shown in FIG. 9, the second fiber stub 60 is inclined by an angle θ2 for rectifying the direction of emergence of the light from the second fiber stub 60 to be coaxial with the direction of incidence of the light. In this case, a best optical coupling efficiency can be achieved.

The above embodiment is only used to illustrate the present invention, not intended to limit the scope thereof. It is understood that many changes or modifications of the above embodiment can be made by those who are skilled in this field without departing from the spirit of the present invention. The scope of the present invention is limited only by the appended claims.

What is claimed is:

1. An optical module, comprising:
   an optical fiber having a first portion extending in a first direction and a second portion extending in a second direction different from said first direction; and
   a coupling head receiving said first and second portions of said optical fiber, wherein said coupling head comprises a fiber stub receiving said first portion of said optical fiber and a base seat receiving said fiber stub and said first and second portions of said optical fiber, wherein a first hole in said base seat extends in said first direction and accommodates said fiber stub and said first portion of said optical fiber, wherein said base seat has no step against said fiber stub, wherein a second hole in said base seat extends in said second direction and accommodates said second portion of said optical fiber, wherein said first hole communicates with said second hole, wherein a first optical-fiber passageway passing through said fiber stub extends in said first direction and receives said first portion of said optical fiber.

2. The optical coupling module of claim 1, wherein said fiber stub has a surface substantially coplanar with a surface of said optical fiber.

3. The optical coupling module of claim 1, wherein said coupling head further comprises a fiber support in said second hole in said base seat, wherein a second optical-fiber passageway passing through said fiber support extends in said second direction and receives said second portion of said optical fiber.

4. The optical coupling module of claim 1, wherein a light emerging from said optical fiber is configured to be substantially coaxial with a light incident to said optical fiber.

5. The optical coupling module of claim 1, wherein said first portion of said optical fiber has a light incident surface not normal but oblique to said first direction.

6. The optical coupling module of claim 5, wherein said first portion of said optical fiber is configured to couple an optical signal, emitted from a light-emitting element, via said light incident surface.

7. The optical coupling module of claim 5, wherein said fiber stub has a surface substantially coplanar with said light incident surface.

* * * * *